(12) United States Patent
Clark et al.

(10) Patent No.: US 10,871,247 B2
(45) Date of Patent: Dec. 22, 2020

(54) COMPRESSION COUPLINGS

(71) Applicant: Hubbell Incorporated, Shelton, CT (US)

(72) Inventors: Michael Allen Clark, Muskogee, OK (US); David Carl Wartluft, III, Coweta, OK (US)

(73) Assignee: HUBBELL INCORPORATED, Shelton, CT (US)

( * ) Notice: Subject to any disclaimer, the term of this patent is extended or adjusted under 35 U.S.C. 154(b) by 373 days.

(21) Appl. No.: 15/280,099

(22) Filed: Sep. 29, 2016

(65) Prior Publication Data
US 2018/0087697 A1    Mar. 29, 2018

(51) Int. Cl.
| F16L 19/06 | (2006.01) |
| F16L 25/14 | (2006.01) |
| F16L 19/07 | (2006.01) |
| F16L 19/08 | (2006.01) |
| F16L 47/24 | (2006.01) |
| F16L 19/065 | (2006.01) |

(52) U.S. Cl.
CPC ............ *F16L 19/062* (2013.01); *F16L 19/065* (2013.01); *F16L 19/07* (2013.01); *F16L 19/083* (2013.01); *F16L 25/14* (2013.01); *F16L 47/24* (2013.01)

(58) Field of Classification Search
CPC ....... F16L 19/062; F16L 19/065; F16L 19/07; F16L 19/083; F16L 25/14; F16L 25/47; F16L 25/24; F16L 21/00; F16L 5/08; F16L 15/00; F16L 15/08

USPC .... 285/133.3, 133.21, 133.4, 333, 390, 354, 285/353, 356, 357, 386, 343
See application file for complete search history.

(56) References Cited

U.S. PATENT DOCUMENTS

| 1,485,139 | A | * | 2/1924 | Levitt | F16L 33/222 285/238 |
| 1,797,277 | A | * | 3/1931 | Thomas | F16N 27/005 138/41 |
| 3,365,219 | A | * | 1/1968 | Nicolaus | F16L 19/086 285/340 |
| 3,400,953 | A | * | 9/1968 | Sullivan | F16L 19/0206 285/116 |
| 3,776,577 | A | * | 12/1973 | Dickey | F16L 19/062 285/31 |
| 3,879,070 | A | * | 4/1975 | Russ | F16L 19/12 285/342 |
| 4,062,572 | A | * | 12/1977 | Davis | F16L 19/08 285/249 |
| 4,798,404 | A | * | 1/1989 | Iyanicki | F16L 19/062 285/12 |
| 4,801,158 | A | * | 1/1989 | Gomi | F16L 25/0036 285/330 |
| 4,878,698 | A | * | 11/1989 | Gilchrist | F16L 21/08 285/342 |

(Continued)

OTHER PUBLICATIONS

Brochure for Philmac (R) Compression Fittings, 12 pages, 2005.

(Continued)

*Primary Examiner* — Matthew Troutman
*Assistant Examiner* — William S. Choi
(74) *Attorney, Agent, or Firm* — Wissing Miller LLP

(57) ABSTRACT

A compression coupling includes a sealing joint for sealingly coupling a pipe to the compression coupling and a restraining joint separate from the sealing joint for restraining the pipe to the compression coupling.

12 Claims, 8 Drawing Sheets

(56) References Cited

U.S. PATENT DOCUMENTS

| | | | | |
|---|---|---|---|---|
| 5,121,949 A * | 6/1992 | Reese | ................... | F16L 47/04 |
| | | | | 285/255 |
| 5,308,122 A * | 5/1994 | Crawford | ............. | F16L 25/023 |
| | | | | 285/332.4 |
| 5,466,019 A * | 11/1995 | Komolrochanaporn | ..................... | |
| | | | | F16L 19/12 |
| | | | | 285/339 |
| 5,957,509 A * | 9/1999 | Komolrochanaporn | ..................... | |
| | | | | F16L 19/12 |
| | | | | 285/343 |
| 6,102,445 A * | 8/2000 | Thomas | ............. | F16L 25/0036 |
| | | | | 285/139.1 |
| 6,746,055 B1 * | 6/2004 | Wood | ................... | F16L 19/062 |
| | | | | 285/222.1 |
| 6,812,406 B2 * | 11/2004 | Hand | .................. | H02G 3/0666 |
| | | | | 16/2.1 |
| 6,913,292 B2 * | 7/2005 | Snyder, Sr. | ........... | F16L 37/091 |
| | | | | 285/104 |
| 7,014,217 B2 * | 3/2006 | Liu | ....................... | F16L 19/061 |
| | | | | 285/249 |
| 7,069,958 B2 * | 7/2006 | Filho | .................... | E21B 17/017 |
| | | | | 138/106 |
| 7,210,504 B2 | 5/2007 | Filho et al. | | |
| 7,303,418 B2 * | 12/2007 | O'Connor | ......... | H01R 13/5208 |
| | | | | 439/277 |
| 7,419,190 B1 * | 9/2008 | Atkinson | .............. | F16L 19/083 |
| | | | | 285/249 |
| 8,586,881 B1 * | 11/2013 | Shemtov | ............... | F16L 19/061 |
| | | | | 174/652 |
| 8,925,978 B2 | 1/2015 | Jamison et al. | | |
| 9,231,397 B2 * | 1/2016 | Chiu | ...................... | F16J 15/022 |
| 9,671,049 B1 * | 6/2017 | Crompton | ............ | F16L 19/065 |
| 2004/0061333 A1 * | 4/2004 | Chu | ...................... | F16L 19/061 |
| | | | | 285/339 |
| 2004/0255608 A1 * | 12/2004 | Hector | .................. | F16L 19/065 |
| | | | | 62/474 |
| 2005/0035593 A1 * | 2/2005 | Auray | ................... | F16L 19/063 |
| | | | | 285/154.1 |
| 2005/0151370 A1 * | 7/2005 | Vyse | ..................... | F16L 19/005 |
| | | | | 285/92 |
| 2006/0244256 A1 * | 11/2006 | Hyobu | .................. | F16L 19/025 |
| | | | | 285/247 |
| 2008/0203723 A1 * | 8/2008 | Cellemme | ............ | F16L 19/062 |
| | | | | 285/39 |
| 2008/0303278 A1 * | 12/2008 | Lee | ....................... | F16L 19/025 |
| | | | | 285/382.7 |
| 2009/0174154 A1 * | 7/2009 | Chiu | ....................... | F16L 5/00 |
| | | | | 277/603 |
| 2010/0019484 A1 * | 1/2010 | Krohn | .................. | F16L 19/065 |
| | | | | 285/104 |
| 2013/0181445 A1 * | 7/2013 | Glime | .................... | F16L 15/04 |
| | | | | 285/337 |
| 2014/0145435 A1 * | 5/2014 | Zhu | ....................... | F16L 19/061 |
| | | | | 285/355 |
| 2014/0264117 A1 * | 9/2014 | Lai | ......................... | F16L 15/04 |
| | | | | 251/148 |
| 2018/0119953 A1 * | 5/2018 | Sugatani | ................. | F23J 13/04 |

OTHER PUBLICATIONS

Dresser Brochure for Style 90 (TM) Compression Fittings for Water, 4 pages, 2009.

Continental Industries Brochure for Gas Distribution Products, Steel Couplings, 11 pages, Aug. 2014.

Chicago Fittings Corporation Catalog "Gas Products Catalog", 20 pages.

* cited by examiner

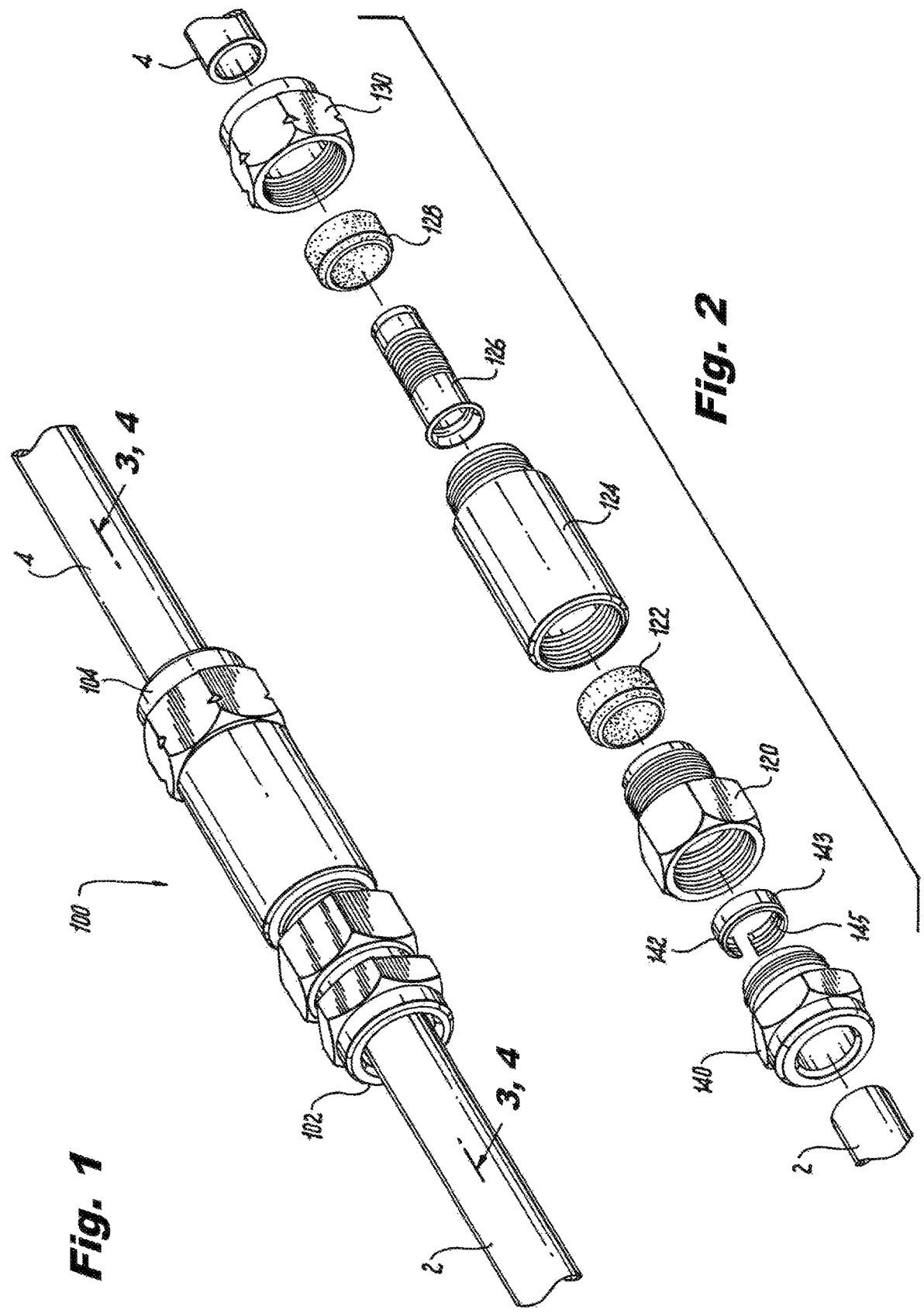

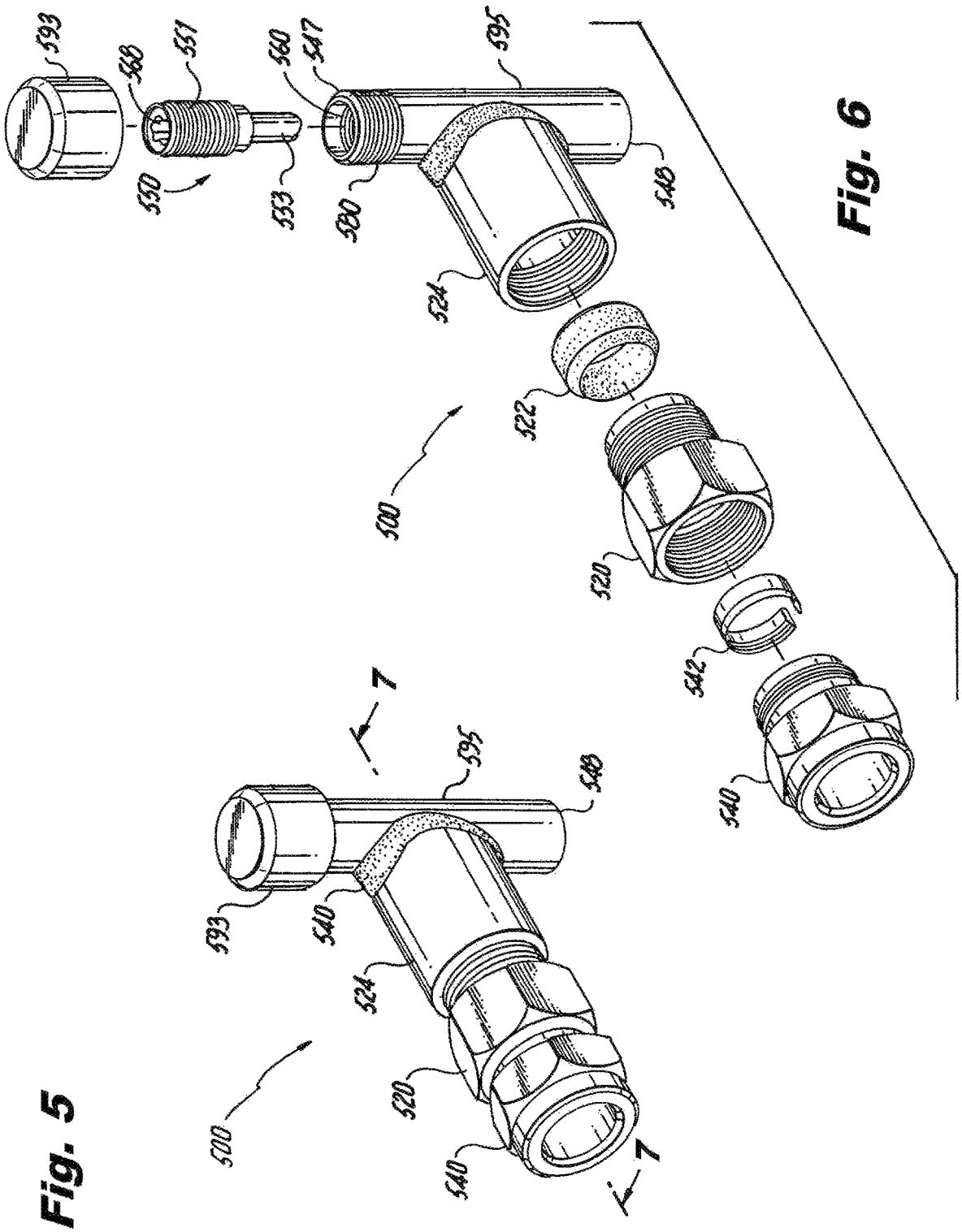

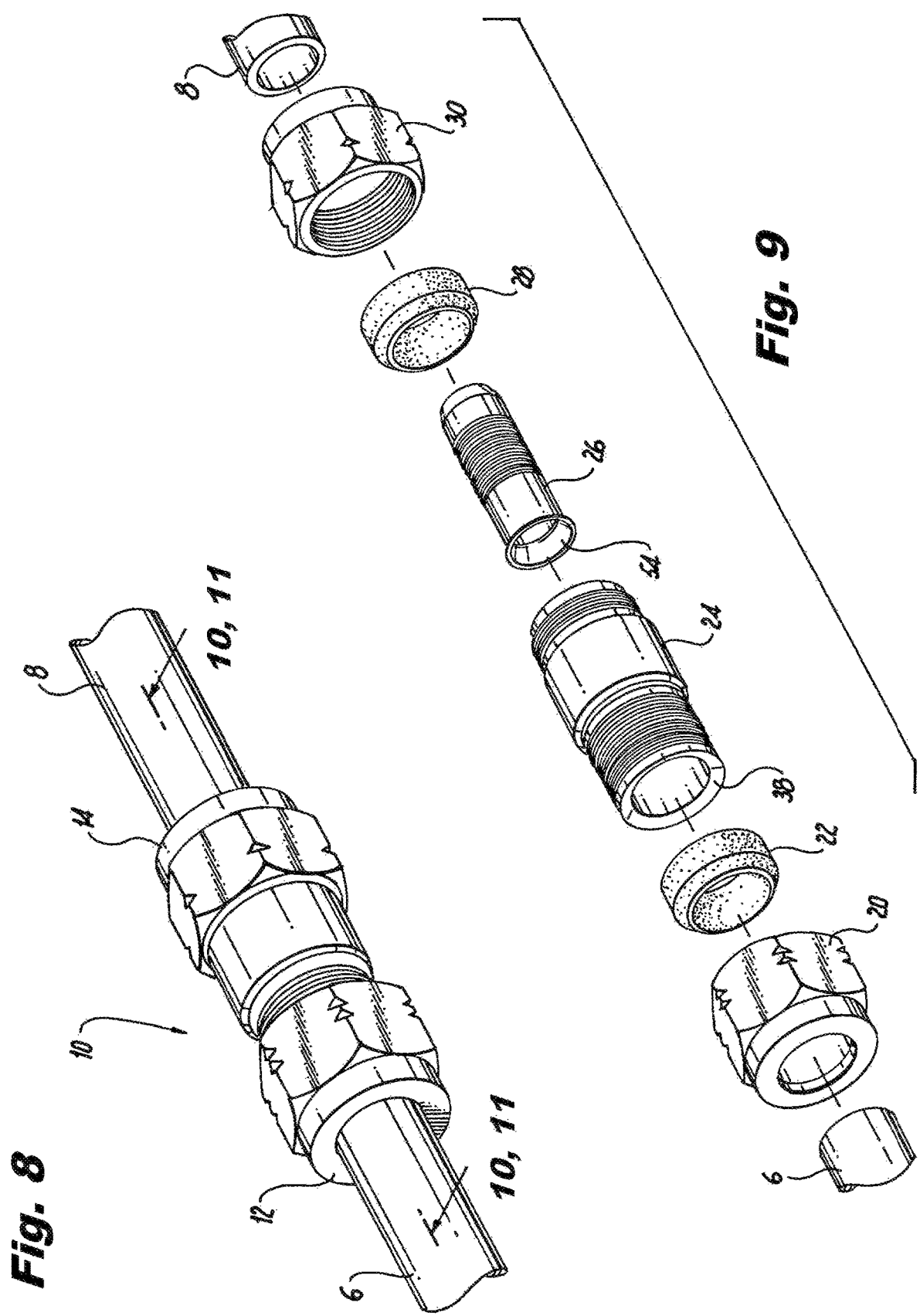

COMPRESSION COUPLINGS

BACKGROUND

Field

The present disclosure relates to couplings and, more particularly, to compression couplings.

Description of the Related Art

The use of non-metallic pipe in home and industry has grown tremendously. For example, non-metallic pipe is now used in water distribution systems, natural gas distribution systems, etc. Often a connection is made between the non-metallic pipe and a metal pipe utilizing a compression coupling. The compression coupling may be dimensioned for connecting non-metallic pipe to metallic pipe each having the same diameter. Alternatively, the compression coupling may be a reducer coupling for connecting non-metallic pipe to metallic pipe having different diameters.

A compression coupling is shown in FIGS. 8-11 and is referred to generally as coupling 10. Coupling 10 includes a first end 12 having an opening for receiving piping 6 and a second end 14 having an opening for receiving piping 8. Piping 6 is generally a metallic piping and piping 8 is generally a non-metallic piping. For example, piping 6 may be any suitable metallic material including but not limited to steel, copper, aluminum, etc. Piping 8 may be any suitable non-metallic material including but not limited to polyethylene (PE), crosslinked polyethylene (PEX), etc.

As shown in FIG. 9, coupling 10 is formed from components including compression nut 20, seal rings 22, 28, adapter coupling 24, stiffener 26 and compression nut 30. Referring to FIG. 10, compression nut 20 includes threaded female section 32 which receives threaded male section 34 of adapter coupling 24. Compression nut 20 includes a section 36 having a tapered end 40 dimensioned to receive seal ring 22. Adapter coupling 24 also includes a flared end 38 dimensioned to abut seal ring 22. Compression nut 30 includes threaded female section 42 which receives threaded male section 44 of adapter coupling 24. Compression nut 30 includes a section 46 having a tapered end 50 dimensioned to receive seal ring 28. Adapter coupling 24 also includes a flared end 48 dimensioned to abut seal ring 28. Adapter coupling 24 includes a grooved section 52 for receiving flared end 54 of stiffener 26. Referring to FIG. 11, compression nut 20 is loosened and metallic pipe 6 is inserted until it bottoms in the coupling. Compression nut 20 is then tightened compressing seal ring 22 which expands against metallic pipe 6, providing a sealing joint and a restraining joint against metallic pipe 6. Compression nut 30 is loosened and non-metallic pipe 8 is inserted until it bottoms in the coupling. Compression nut 30 is then tightened compressing seal ring 28 which expands against non-metallic pipe 8, providing a sealing joint and a restraining joint against non-metallic pipe 8.

The sealing and restraining joints provided by coupling 10 described above by reference to FIGS. 8-11 are sufficient in most instances. However, it would be beneficial to provide a coupling having increased resistance to pull-out, particularly on the end of the coupling to which the metallic pipe is coupled.

SUMMARY

A compression coupling includes a sealing joint for sealingly coupling a pipe to the compression coupling and a restraining joint separate from the sealing joint for restraining the pipe to the compression coupling.

A compression coupling for coupling metallic piping to non-metallic piping, the compression coupling including a sealing joint for sealingly coupling the metallic piping to the compression coupling a restraining joint separate from the sealing joint for restraining the metallic piping to the coupling and a sealing/restraining joint for sealing and restraining the non-metallic piping to the coupling.

A punch tee includes a pipe attachable to a service line and a compression coupling extending from the pipe. The compression coupling includes a sealing joint for sealingly coupling a pipe to the compression coupling, and a restraining joint separate from the sealing joint for restraining the pipe to the compression coupling.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 depicts a perspective view of a coupler according to an illustrative embodiment of the present disclosure;

FIG. 2 depicts an exploded view of a coupler according to an illustrative embodiment of the present disclosure;

FIG. 5 depicts a perspective view of a coupler according to another illustrative embodiment of the present disclosure;

FIG. 6 depicts an exploded view of the coupler according to an illustrative embodiment of the present disclosure;

FIG. 8 depicts a perspective view of a background coupler;

FIG. 9 depicts an exploded view of a background coupler;

DETAILED DESCRIPTION

Figure 3:
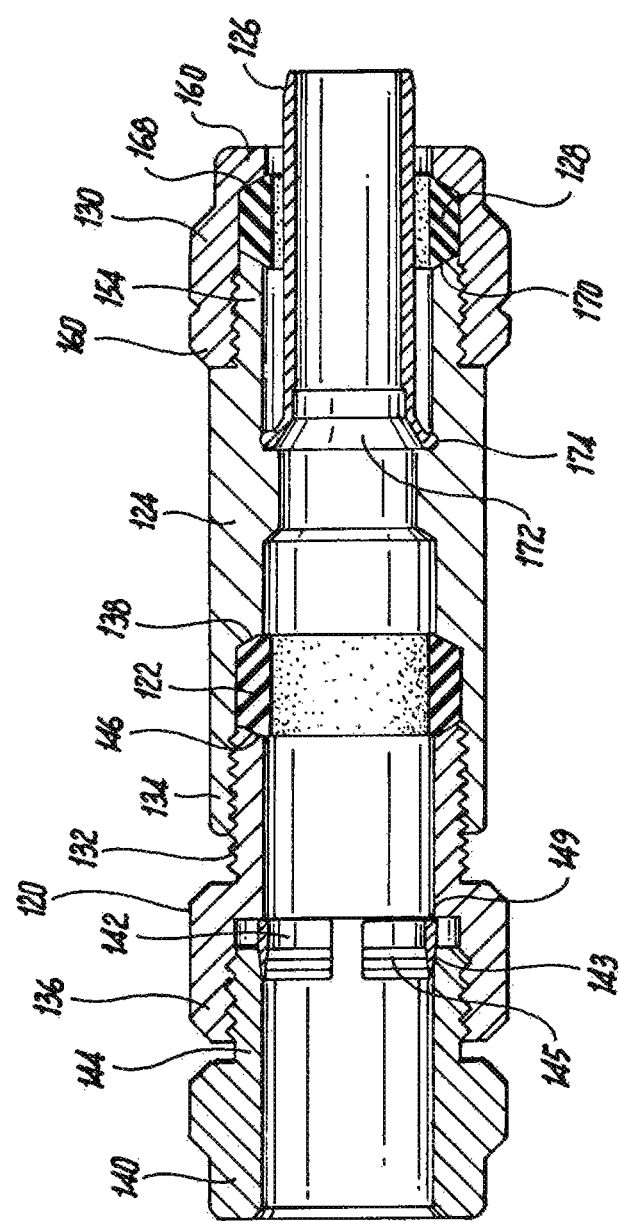
FIG. 3 depicts a section view of a coupler taken along lines 3,4 of FIG. 1, without piping in place according to an illustrative embodiment of the present disclosure.

Illustrative embodiments of the present disclosure may be provided as improvements to compression couplings. For example, a compression coupling for coupling a metallic tube to a non-metallic tube may provide improved resistance to pull-out of the metallic tube from the coupling.

Illustrative embodiments of the present disclosure provide compression couplings for piping. According to illustrative embodiments, the compression coupling may be a coupling for attaching metallic piping with non-metallic piping and having improved resistance to pull out.

Illustrative embodiments of the present disclosure provide compression couplings for joining metallic pipe with non-metallic pipe. The compression coupling includes a sealing joint and a restraining joint for joining the metallic pipe.

The compression couplings as described herein may be of various sizes and dimensioned as suitable for particular applications. For example, a compression coupling may have one end dimensioned for attachment to a metallic pipe of one diameter and the other end dimensioned for attachment to a non-metallic pipe of the same or different diameter.

A compression coupling according to an illustrative embodiment of the present disclosure may be provided as part of a punch tee.

Components of the compression couplings as described herein may be copper, aluminum, steel, brass, etc. or other material suitable for a particular application. Parts of the compression couplings including seal rings, compression rings, etc. may be made of nitrile or other material suitable for a particular application.

A compression coupling according to an illustrative embodiment of the present disclosure is shown in FIGS. 1-4 and is referred to generally as coupling 100. Coupling 100 includes a first end 102 having an opening for receiving piping 2 and a second end 104 having an opening for receiving piping 4. Piping 2 is generally a metallic piping and piping 4 is generally a non-metallic piping. For example, piping 2 may be any suitable metallic material including but not limited to steel, copper, aluminum, etc. Piping 4 may be any suitable non-metallic material including but not limited to polyethylene (PE), crosslinked polyethylene (PEX), etc.

As shown in FIG. 2, coupling 100 includes a restraining compression nut 140, compression ring 142, compression nut 120, seal rings 122, 128, adapter coupling 124, stiffener 126 and compression nut 130. Referring to FIG. 3, compression nut 120 includes threaded male section 132 which is received in threaded female section 134 of adapter coupling 124. An end 146 of compression nut 120 is tapered and abuts seal ring 122. Compression nut 120 also includes a threaded female section 136 for receiving threaded male section 144 of compression nut 140. Adapter coupling 124 also includes a flared end 138 dimensioned to receive seal ring 122. Compression ring 142 abuts an edge surface 149 of compression nut 120. The opposite side of compression ring 142 has a slightly beveled edge 143 which rides under compression nut 140 when compression nut 140 is tightened. Compression ring 142 includes inside radial grooves 145 providing added grip. Compression nut 130 includes threaded female section 160 which receives threaded male section 154 of adapter coupling 124 and includes a tapered end 168 dimensioned to receive seal ring 128. Adapter coupling 124 also includes a tapered end 170 dimensioned to abut seal ring 128. Adapter coupling 124 also includes a grooved section 172 for receiving flared end 174 of stiffener 126.

Figure 4:
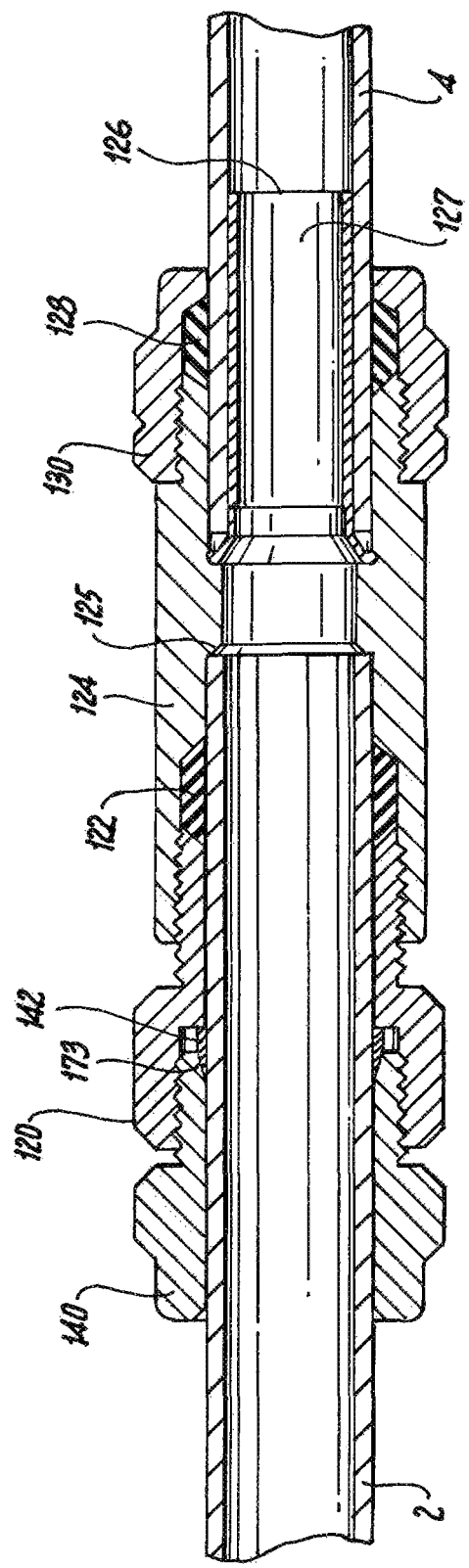
FIG. 4 depicts a section view of a coupler taken along lines 3,4 of FIG. 1 with piping in place according to an illustrative embodiment of the present disclosure.

Referring to FIG. 4, compression nuts 120, 130 and 140 are loosened by rotating each counterclockwise (or clockwise depending on threaded arrangement). Metallic pipe 2 is inserted through compression nuts 140 and 120 and into adapter coupling 124 until the distal end of pipe 2 abuts edge 125 of coupling 124. When compression nut 120 is then tightened by clockwise rotation, seal ring 122 is compressed and expands against metallic pipe 2, providing a sealing joint. When compression nut 140 is then tightened by clockwise rotation, the distal end of compression nut 140 rides over compression ring 142 compressing ring 142 against metallic pipe 2 and creating a restraining joint separate from the sealing joint. Non-metallic pipe 4 is inserted through compression nut 130 and into coupling 124 until it bottoms in the coupling. Compression nut 130 is then tightened by clockwise rotation, compressing seal ring 128 which expands against non-metallic pipe 4, providing a sealing joint and a restraining joint against non-metallic pipe 4.

Figure 7:
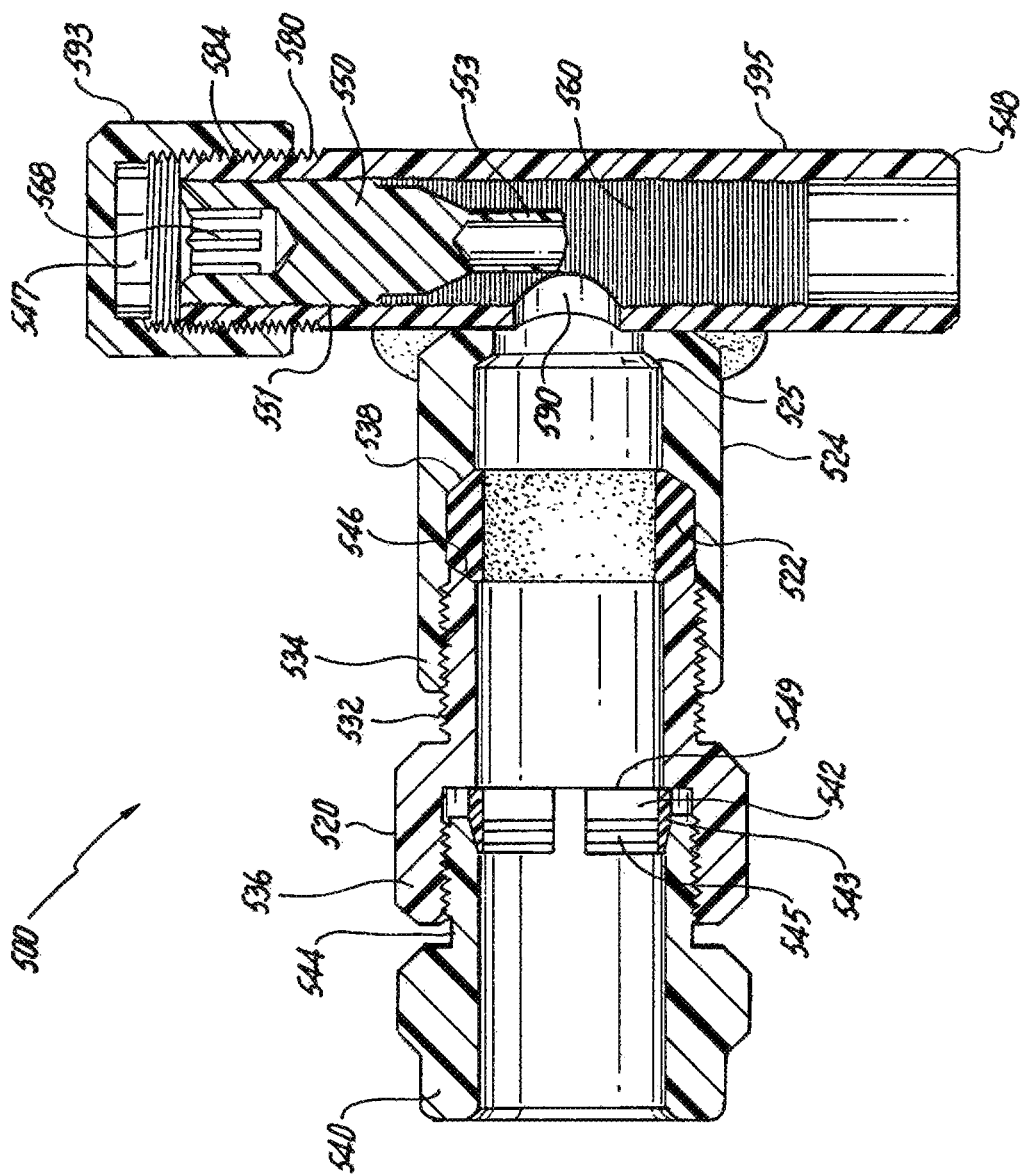
FIG. 7 depicts a section view of a coupler taken along lines 7,7 of FIG. 5 according to an illustrative embodiment of the present disclosure
Figure 10:
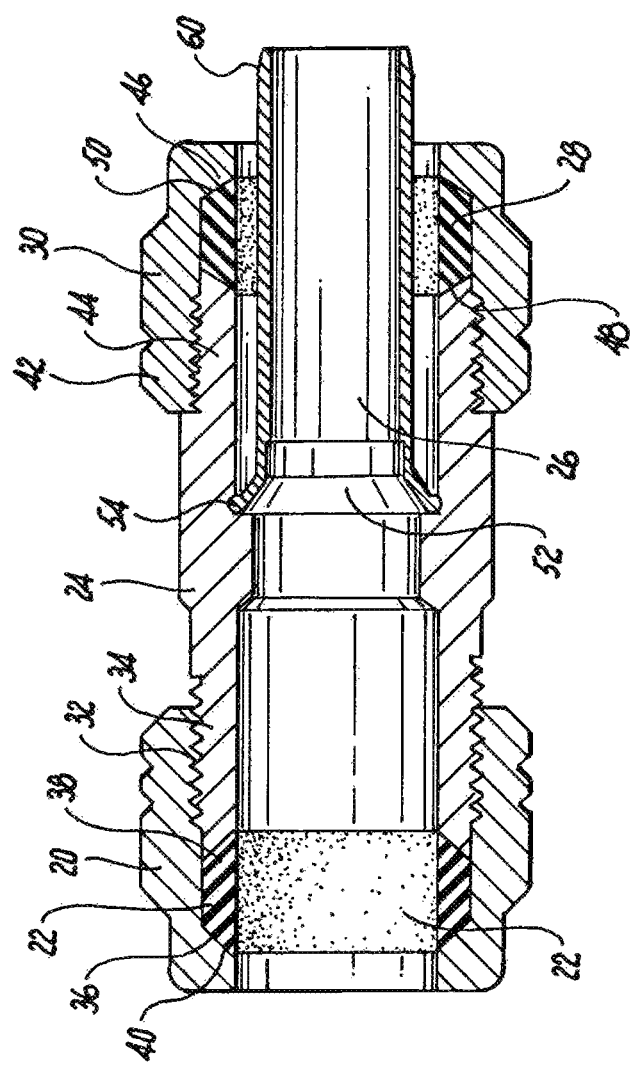
FIG. 10 depicts a section view of a background coupler taken along lines 10,11 of FIG. 8, without piping in place.
Figure 11:
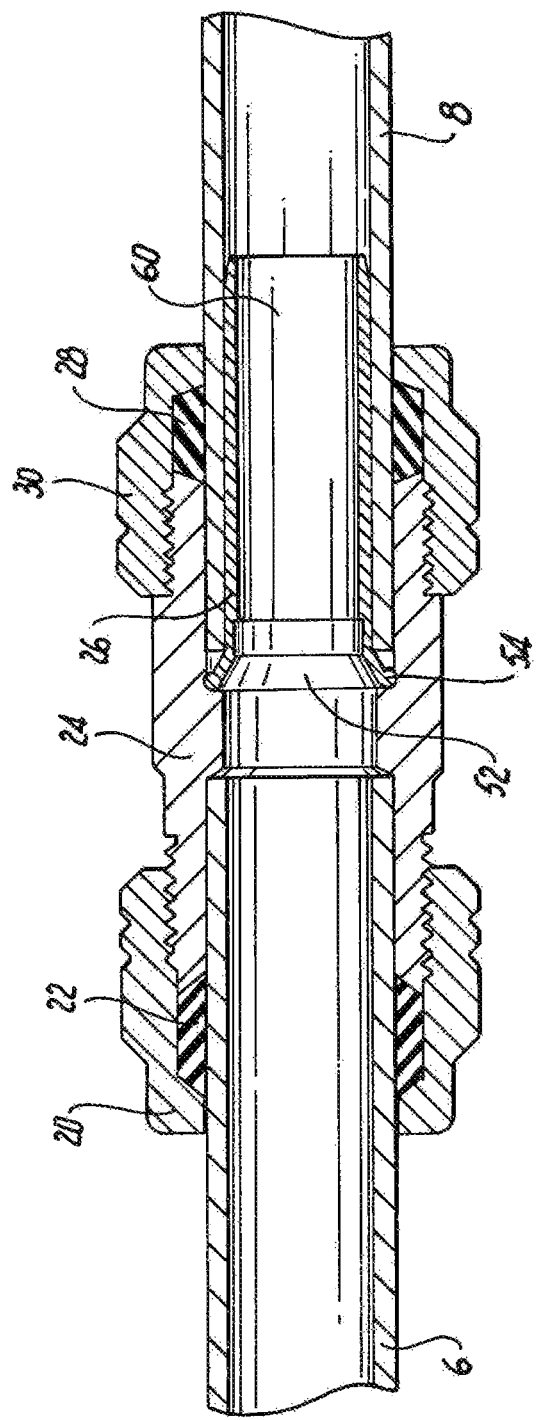
FIG. 11 depicts a section view of a background coupler taken along lines 10,11 of FIG. 8 with piping in place.

A compression coupling according to another illustrative embodiment of the present disclosure is shown in FIGS. 5-7. A compression coupling 500 according to an embodiment of the present disclosure is formed as part of a punch tee. Punch tees are generally used to add an outlet to an existing service such as a natural gas service, water service, etc. According to this illustrative embodiment, the punch tee includes a steel body 595 having a steel adapter coupling 524 welded thereto. As shown in FIGS. 6 and 7, the compression coupling 500 includes a restraining compression nut 540, compression ring 542, compression nut 520 and seal ring 522. The punch tee also includes a threaded punch 550 which is received in body 595 and a threaded cap 593. Referring to FIG. 7, an orifice 590 is provided between body 595 and adapter coupling 524. Compression nut 520 includes threaded male section 532 which is received in threaded female section 534 of adapter coupling 524. An end 546 of compression nut 520 is tapered and abuts seal ring 522. Compression nut 520 also includes a threaded female section 536 for receiving threaded male section 544 of compression nut 540. Adapter coupling 524 also includes a flared end 538 dimensioned to receive seal ring 522. Compression ring 542 abuts an edge surface 549 of compression nut 520. The opposite side of compression ring 542 has a slightly beveled edge 543 which rides under compression nut 540 when compression nut 540 is tightened. Compression ring 542 includes inside radial grooves 545 providing added grip. Steel body 595 includes a threaded inner portion 560 and an outer threaded section 580. Steel cap 593 includes inner threads 584 so that steel cap 593 can be threaded onto threads 580 on the upper portion 547 of body 595. The threaded punch 550 includes a threaded section 551 which is received by threaded inner portion 560 of body 595. Punch 550 includes a distal end cutting or punching bit 553 and a recessed portion 568 dimensioned to receive a wrench such as a star bit wrench or a hexagonal bit wrench.

To utilize the punch tee, distal end 548 of body 595 is attached to a service pipe utilizing a weld, thread or saddle type inlet. That is, distal end 548 may be threaded to a correspondingly threaded portion of a service pipe. Alternatively, distal end 548 may be attached (e.g., welded) to a saddle that clamps around the service pipe and maintains the punch tee in position. The distal end 548 shown in FIG. 7 may be welded directly to the service pipe. A metallic pipe is then attached to compressive coupling 500 as described below. Compression nuts 540 and 520 are loosened. A metallic pipe (not shown) is inserted through compression nuts 540 and 520 and into adapter coupling 524 until the distal end of the pipe abuts edge 525 of adapter coupling 524. When compression nut 520 is then tightened by clockwise rotation, seal ring 522 is compressed and expands against the metallic pipe, providing a sealing joint. When compression nut 540 is then tightened by clockwise rotation, the end of compression nut 540 rides over compression ring 542 compressing ring 542 against the metallic pipe and creating a restraining joint. Compression coupling 500 thus provides a secure restraining joint and a sealing joint separate from the restraining joint between the metallic pipe and the punch tee. After the compression joint is made, cap 593 is removed and an appropriate wrench is placed in recessed portion 568. Punch 550 is rotated in the clockwise direction until bit 553 cuts through the service pipe. Punch 550 is then rotated in the counter clockwise direction to the position shown in FIG. 7 and cap 593 is replaced.

The term pipe, piping, tube, tubing may be used interchangeably herein and refer to any suitable type of supply line capable of being joined utilizing compression couplings.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A coupling for coupling metallic piping to non-metallic piping, the coupling comprising:
    an adapter coupling having a first mating end, a second mating end, a longitudinal bore extending from the first mating end of the adapter coupling to the second mating end of the adapter coupling, and a first seal mating surface within the longitudinal bore;
    a pipe sealing assembly including:
        a seal ring positioned within the longitudinal bore of the adapter coupling and accessible through the first mating end of the adapter coupling; and
        a seal compression member having a first mating end, a second mating end opposite the first mating end and a bore extending from the first mating end of the seal compression member to the second mating end of the seal compression member, the first mating end of the seal compression member having a distal end with a second seal mating surface, the first mating end of the seal compression member being releasably secured to the first mating end of the adapter coupling such that the seal compression member bore is aligned with the longitudinal bore and such that the seal ring is in contact with the first and second seal mating surfaces when the seal compression member is tightened;
    a pipe restraining assembly including:
        a restraining compression member having a first mating end, a pipe receiving end opposite the first mating end and a bore extending from the first mating end of the restraining compression member to the pipe receiving end, the first mating end of the restraining compression member being releasably secured to the second mating end of the seal compression member such that the restraining compression member bore is aligned with the seal compression member bore; and
        a compression ring positioned at least partially within the restraining compression member bore between the first mating end of the restraining compression member and the second mating end of the seal compression member; and
    a pipe holding assembly including:
        a stiffening member positioned in the longitudinal bore and accessible from the second mating end of the adapter coupling, the stiffening member being used to stiffen a non-metallic pipe inserted into the second mating end of the adapter coupling;
        a second seal ring positioned within the longitudinal bore of the adapter coupling and around at least a portion of the stiffening member; and
        a pipe holding compression member having a first mating end and a bore extending therethrough, the first mating end of the of the pipe holding compression member being releasably secured to the second mating end of the adapter coupling such that the of the pipe holding compression member bore is aligned with the longitudinal bore and such that the second seal ring is adjacent the first mating end of the of the pipe holding compression member.

2. The pipe coupling as recited in claim 1, wherein the seal compression member comprises a compression nut and the restraining compression member comprises a compression nut.

3. The pipe coupling as recited in claim 2, wherein the first mating end of the seal compression nut comprises a male mating end and the first mating end of the adapter coupling comprises a female mating end;
    wherein the male mating end of the seal compression nut is coupled to the female mating end of the coupling adapter;
    wherein the first mating end of the restraining compression nut comprises a male mating end and the second mating end of the seal compression nut comprises a female mating end; and
    wherein the male mating end of the restraining compression nut is coupled to the female mating end of the seal compression nut.

4. The pipe coupling as recited in claim 1, wherein the seal compression member compresses the seal ring.

5. The pipe coupling as recited in claim 1, wherein the restraining compression member compresses the compression ring.

6. The pipe coupling as recited in claim 1, wherein the pipe holding compression member comprises a compression nut.

7. The pipe coupling as recited in claim 6, wherein the first mating end of the pipe holding compression nut comprises a female mating end;
    wherein the second mating end of the adapter coupling comprises a male mating end; and
    wherein the female mating end of the pipe holding compression nut is coupled to the male mating end of the adapter coupling.

8. The compression coupling as recited in claim 1, wherein the pipe holding compression member compresses the second seal ring.

9. A pipe fitting comprising:
    an adapter coupling having a first mating end, a longitudinal bore extending therethrough, a first seal mating surface within the longitudinal bore, and a second mating end opposite the first mating end of the adapter coupling such that the longitudinal bore extends to the second mating end;
    a pipe sealing assembly including:
        a seal ring positioned within the longitudinal bore of the adapter coupling and accessible through the first mating end of the adapter coupling; and
        a seal compression member having a first mating end, a second mating end opposite the first mating end and a bore extending from the first mating end of the seal compression member to the second mating end of the seal compression member, the first mating end of the seal compression member having a distal end with a second seal mating surface, the first mating end of the seal compression member being releasably secured to the first mating end of the adapter coupling such that the seal compression member bore is aligned with the longitudinal bore and such that at least a portion of the seal ring is in contact with the first and second seal mating surfaces when the seal compression member is tightened; and a pipe restraining assembly including:
  a restraining compression member having a first mating end, a pipe receiving end opposite the first mating end and a bore extending from the first mating end of the restraining compression member to the pipe receiving end, the first mating end of the restraining compression member being releasably secured to the second mating end of the seal compression member such that the restraining compression member bore is aligned with the seal compression member bore;
a compression ring positioned at least partially within the restraining compression member bore between the first mating end of the restraining compression member and the second mating end of the seal compression member, the compression ring restraining a pipe within the pipe fitting when the restraining compression member is tightened; and
a pipe holding assembly including:
  a stiffening member positioned in the longitudinal bore and accessible from the second mating end of the adapter coupling, the stiffening member being used to stiffen a non-metallic pipe inserted into the second mating end of the adapter coupling;
  a second seal ring positioned within the longitudinal bore of the adapter coupling and around at least a portion of the stiffening member; and
  a pipe holding compression member having a mating end and a bore extending therethrough, the mating end of the of the pipe holding compression member being releasably secured to the second mating end of the adapter coupling such that the pipe holding compression member bore is aligned with the longitudinal bore and such that the second seal ring is adjacent the first mating end of the of the pipe holding compression member.

10. The pipe fitting as recited in claim 9, wherein the pipe holding compression member comprises a compression nut.

11. The pipe fitting as recited in claim 10, wherein the first mating end of the pipe holding compression nut comprises a threaded female end;
  wherein the second mating end of the adapter coupling comprises a threaded male end; and
  wherein the female end of the pipe holding compression nut is threaded into the male end of the adapter coupling to releasably secure the pipe holding compression nut to the adapter coupling.

12. The pipe fitting as recited in claim 9, wherein the pipe fitting comprises a coupling.

* * * * *